March 3, 1959  P. G. ANDERSON  2,875,461

WASHING DEVICE

Filed July 15, 1954

INVENTOR.
Philip G. Anderson
BY
Kenneth D. Snow
Atty.

United States Patent Office 2,875,461
Patented Mar. 3, 1959

2,875,461
WASHING DEVICE
Philip G. Anderson, Park Ridge, Ill.

Application July 15, 1954, Serial No. 443,565

2 Claims. (Cl. 15—118)

This invention relates to a new and improved washing device.

The washing of windows and, more particularly, the washing of automobile windshields has long existed as a major problem. In recent years the increasing of automobile engine horsepowers has concurrently increased the speeds at which the automobiles travel. This causes an increased number of bugs and insects to be struck by the fast moving windshields and a resultant smashing and/or smearing of the bugs and insects over the windshields. Another cause for dirty windshields is the inclination at which the windshield is placed by the manufacturer. This provides a surface against which the sap from trees or the like may fall directly thereon. For safe driving it is essential that a windshield be as clean as possible and as free of foreign matter as possible to aid in maximum visibility and driver efficiency. To facilitate clean windshields the gasoline service stations throughout the country have accepted the task of washing the windshields of automobiles as they come into the service station for gasoline or oil or the like.

It is, therefore, a principal object of this invention to provide a washing device specifically adapted to the windshields of automobiles.

An important object of this invention is the provision of a means in a single washing device for applying water to the windshield and subsequently wiping the applied water and dirt from the windshield without causing a streaking thereon.

Another and further important object of this invention is to supply a washing device for automobile windshields which comprises a toweling material and a chamois material.

A still further important object of this invention is to equip a washing device with a cord means woven therein to enable the user thereof to gain sufficient abrasive characteristics to rid the windshield of smeared bugs and/or tree sap.

Another and still further important object of this invention is to provide a washing device for automobile windshields in the form of a hand mitt having a toweling material on one side and a chamois material on the other side.

A still further important object of this invention is the provision of means in a hand mitt washing device having relatively stiff cords woven within a relatively soft toweling material wherein the windshield of an automobile may be conveniently washed and at the same time enable the operator to scrub the bugs and other foreign matter from the windshield by reason of the stiffer cords which form an integral part of the hand mitt washing device.

Other and further important objects and advantages will become apparent from the disclosures in the following specification and accompanying drawings.

Figure 1:
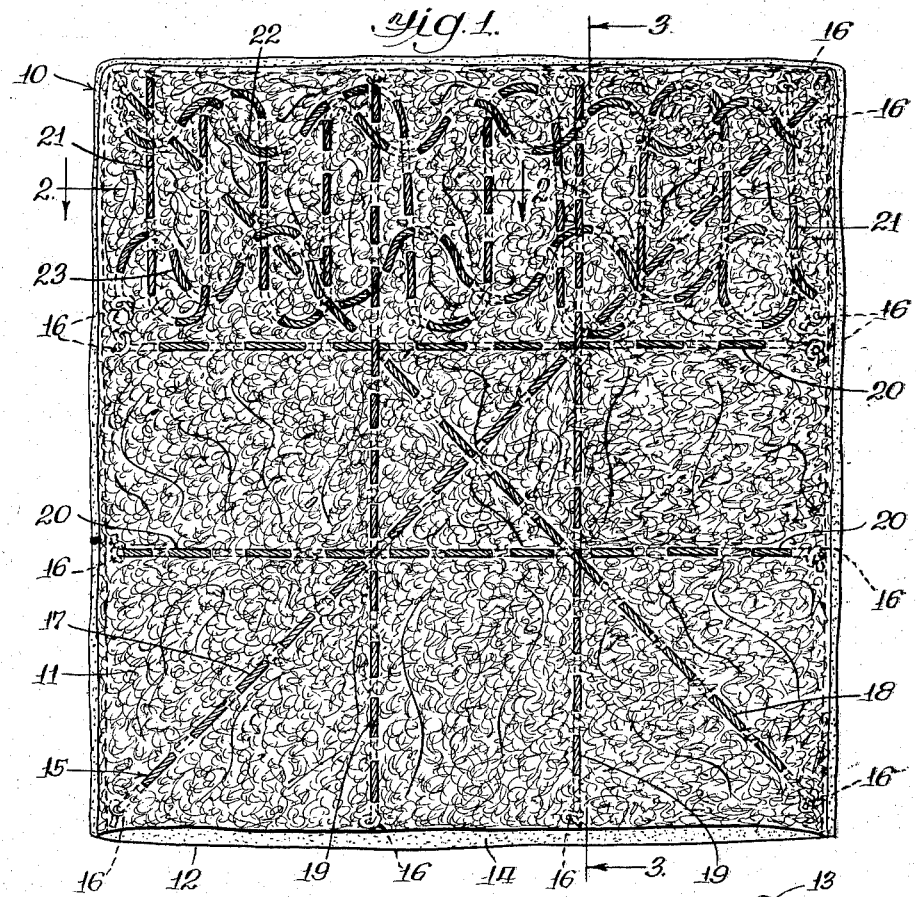
Figure 1 is a plan view of one surface of the mitt type washing device of this invention.
Figure 2:
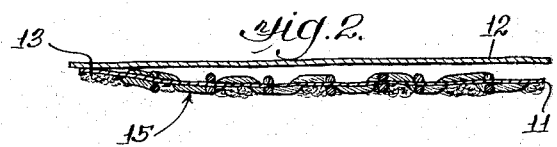
Figure 2 is a sectional view taken on the line 2—2 of Figure 1.
Figure 3:
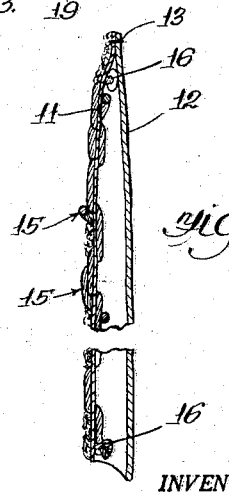
Figure 3 is a sectional view taken on the line 3—3 of Figure 1.
Figure 4:
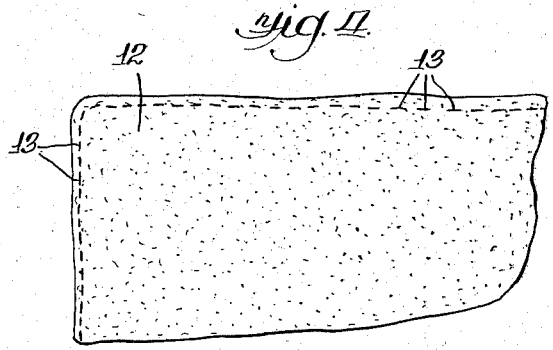
Figure 4 is a partial plan view of the bottom of the mitt type washing device.

The reference numeral 10 indicates generally a mitt type washing device. Principally, as stated in the objects above, the washing device is for the purpose of cleaning windows and, still more particularly, the cleaning of automobile windshields. The washing mitt 10 includes a rectangularly shaped toweling material 11 forming one surface of the mitt. The other side of the mitt 10 comprises a rectangularly shaped chamois material 12. A stitching 13 joins the toweling 11 and the chamois 12 on three sides thereof. A hand opening 14 is disposed between the toweling 11 and the chamois 12 to permit the operator to insert his hand and use the washing device with either the toweling material 11 as the operating surface or the chamois material 12 as the operating surface as the situation requires.

Relatively large stiff cords 15 are woven into the toweling 11 so that they intermittently appear on the working surface of the toweling 11. Knots 16 are provided at the ends of the cords 15 in order to prevent the pulling through of the cords and to maintain the cords in the geometrical pattern in which they are arranged on the toweling material. These numerical designations 15 and 16 apply generally to all of the cords applied to the toweling. However, the particular row or line of cords will be further designated by special numerals in order to clearly define the positioning of these cords on the mitt. Diagonal cords 17 and 18 form a cross on the toweling surface of the mitt. Vertical cords 19 are provided at intervals along the mitt and similarly horizontal cords 20 are provided across the mitt. The upper end of the mitt opposite the hand opening 14 is the surface of the mitt which will eventually do the most work in effecting the cleaning of windows or automobile windshields and as a result there is a need for more cords in this upper third portion of the mitt. A relatively high and deep undulating pattern of cords 21 is generally vertically disposed and extends across the top portion of the mitt 10. A first row of horizontally disposed undulating pattern of cords 22 extends across the top of the mitt 10 in an interweaving manner with the vertically disposed undulating pattern of cords 21. The horizontally disposed cords have relatively shallow undulations compared to the undulations of the cords 21. A second row of horizontally undulating pattern of cords 23 is spaced below the first row 22 and similarly extends across the top of the mitt 10. The undulations of the cords 23 are substantially the same magnitude as the undulations of the cords 22. Here again the cords 23 are woven in and out amongst the lower portions of the relatively high undulations 21 of the vertical undulating pattern of cords.

In the operation of the device of this invention the user places his hand within the mitt 10 through the opening 14 and dips the entire washing device into a washing solution which may be merely water or the like Thereupon the user applies the toweling surface 11 to the windshield to be washed and commences rubbing. The intermittently disposed portions of cord and more particularly the multiplicity of cords at the upper portion of the mitt provide the necessary abrasive characteristics in order to rub loose the bugs which seem to always be present on the windshields of modern automobiles by reason of their high speeds along the highways. Further, these same cords form the necessary abrasive characteristics in order to rub loose and rid the windshield of the tacky sap material which drops from trees. When the surface of the windshield appears to be relatively clean, the operator then switches the mitt on his hand and applies the chamois to the windshield and removes the excess water therefrom. The chamois skin or leather has long been used as a window washing material by reason of its ability to remove excess water without causing streaking on the windows.

It will thus be seen that herein is provided a complete washing device for windows and as previously stated more particularly the windshields of automobiles. The specific arrangement of cords in the toweling material has been found to provide efficient cleaning of the windows and they are arranged to accommodate the operator's hand within the mitt. The cords which are woven into the towel material have been stated to be relatively large but principally it is desirable that these cords be of a little harder or stiffer material than the toweling so that there is a differential in the abrasive or rubbing characteristics of the towel and the cords so that the cords are more apt to facilitate removal of hard to remove smearings of foreign matter on the windows.

Numerous details of construction may be varied throughout a wide range without departing from the principles disclosed herein and I, therefore, do not propose limiting the patent granted hereon otherwise than as necessitated by the appended claims.

What is claimed is:

1. A washing device comprising a combination of chamois and toweling material in which there is chamois on one side and toweling material on the other side, said chamois and toweling material generally rectangular in shape and of substantially the same size, said chamois and toweling material stitched together to form a hand mitt, and a separate cord woven through portions of the external surface of the toweling material and lying generally in the plane of and lying flat on the external surface of the toweling material to give the washing device an abrasive quality, portions of the woven cord forming a generally uniform pattern on the rectangular surface of the toweling material, and other portions of the woven cord forming an undulating pattern on the upper end of the toweling material adjacent the outer end of the hand mitt.

2. A device as set forth in claim 1 in which the undulating pattern includes a long undulating path in one direction and relatively shallower undulating paths in a direction at right angles thereto, said undulating paths interwoven amongst each other.

References Cited in the file of this patent

UNITED STATES PATENTS

| | | |
|---|---|---|
| 1,478,914 | Ritzenthaler | Dec. 25, 1923 |
| 1,547,179 | Martens | July 28, 1925 |
| 1,782,502 | Crane | Nov. 25, 1930 |
| 1,882,179 | Daly | Oct. 11, 1932 |
| 2,044,361 | McMenamin | June 16, 1936 |
| 2,534,982 | Mayes | Dec. 19, 1950 |
| 2,690,661 | Briggs | Oct. 5, 1954 |